Figure 1:
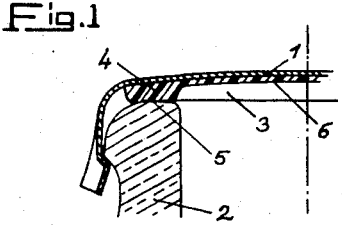

April 8, 1958  A. ISELE-AREGGER  2,829,790
BOTTLE CLOSURES

Filed July 3, 1953  2 Sheets-Sheet 1

Inventor:
Alfons Isele-Aregger,
By Brown, Jackson, Boettcher & Dienner
Attys

April 8, 1958 — A. ISELE-AREGGER — 2,829,790
BOTTLE CLOSURES
Filed July 3, 1953 — 2 Sheets-Sheet 2

Inventor:
Alfons Isele-Aregger,
By Brown, Jackson, Boettcher & Dienner
Attys.

United States Patent Office 2,829,790
Patented Apr. 8, 1958

2,829,790

BOTTLE CLOSURES

Alfons Isele-Aregger, Immensee, Switzerland, assignor to Albert M. Fischer, Dowagiac, Mich.

Application July 3, 1953, Serial No. 365,842

Claims priority, application Germany October 15, 1952

4 Claims. (Cl. 215—40)

The present invention relates to bottle closures, particularly to metallic cap or crown closures for closing liquid containers, and to methods of making such closures.

Bottle caps, also referred to as crown closures, generally comprise a metallic cap, preferably formed of sheet metal, having a corrugated outwardly bent rim within which a cork sealing member is placed, the latter usually being cemented or otherwise secured to the cap. The work disc or seal may comprise either natural or pressed cork and a foil of plastic, tin, aluminum, hydrate cellulose, or the like, is preferably applied to the cork to prevent contamination of the contents of the bottle and to insure a gas-tight seal. Proposals have previously been made in the art to employ seals of rubber or latex instead of cork, but such seals suffer the disadvantage that the same are apt to affect the taste of the contents of the bottle. Inasmuch as it is an essential feature of crown closures, and the sealing materials therefor, that they should be absolutely inert as regards the imparting of taste to the contents of the bottle, such prior closures have not met with success. They may serve satisfactorily for soda water containers, but not for bottles intended for the reception of contents having a delicate flavor, such as beer and the like.

Heretofore, those skilled in the art have been of the opinion that the seal between the crown closure and the beaded mouth of the bottle, when employing cork seals, must take place in the outer region of the mouth or lip of the bottle, and preferably at the point where the lip or mouth of the bottle presents an inclination which, as defined by the inclination of the tangent of that surface toward the horizontal, is about 45° and more. This means that in such liquid containers the seal takes place below the upper surface of the mouth of the bottle and radially outwardly from the inner diameter of the mouth of the bottle. In other words, the annular seal effected in such case has an outer diameter corresponding to the inner diameter of the mouth of the bottle plus substantially twice the thickness of the wall defining the mouth of the bottle.

According to the present invention, it has been found that this prevailing opinion is false, and extensive tests have conclusively shown that an appreciably better seal will be obtained if the outer diameter of the sealing area is at the most equal approximately to the inner diameter of the mouth of the bottle plus twice 75 percent of the thickness of the wall defining the mouth of the bottle.

This means, for instance in the case of bottles having an outer diameter of roughly 26 mm. at the mouth, which bottle is in popular use, that the outside diameter of the annular sealing area should not be greater than approximately 90 percent of the outer diameter of the mouth.

The practicality of the seal as thus formed has been confirmed by numerous tests. In such tests, it has been found that the seal as effected according to the present invention is capable of withstanding gas pressures which are one and one-half to two times as great as the pressures that can be withstood by conventional seals.

From the foregoing, it will be appreciated that considerable importance is attached to the design of the closure caps and sealing inserts provided by the present invention. This is particularly true in view of the fact that when valuable or costly materials are adopted for the purpose of providing the seal, it is essential to economize on the amount of material required in order to manufacture the seals and closures as economically as is possible.

According to the present invention, the material from which the seal is formed should be such as to be absolutely incapable of imparting any taste contaminant to the beverage or liquid to be contained in the bottle, and must also be inert to a wide variety of substances likely to be contained in the bottle. In addition, it is essential that the seal possess a certain minimum resiliency to insure a perfect gas tight seal.

The principal object of the present invention is to provide a homogeneous sealing material embodying the above properties, which material is thickened or padded in the region of the sealing area and adapted to be pressed onto and secured to the mouth of the bottle at an increased pressure. In particular, the sealing or packing surface should commence or be positioned as close to the orifice or opening in the mouth of the bottle as is possible and, in certain cases, the seal should engage to some extent within the mouth orifice. One reason for this latter feature is that tests have shown that closure caps sealed in the manner stated are capable of withstanding extremely high internal gas pressures.

Another object of the present invention is to provide a seal or sealing disc including a sealing bead or collar which may be of any desired cross section, such as square, rectangular, elliptical, semi-circular, circular and so on. In any case, however, the sealing bead and disc are preferably so formed as to satisfy or meet essential requirements and to provide a high degree of convenience with respect to the form of metallic cap with which the same is adapted to be associated.

Since, according to the invention, different materials may be adopted for the seal or sealing insert, which materials may comprise certain plastics having only slight inherent elasticity, it is an object of the invention to provide one or more circular grooves or annular recesses in the region of the sealing collar. The grooves may be of any desired cross section, but are preferably semi-circular in cross section.

An additional object of the invention is to provide a metallic cap having one or more circular or annular depressions therein facing the bottle mouth, which depressions may be formed in the cap in the original stamping operation in which the caps are formed, the depressions being located in that portion of the cap adapted to bear against the sealing or packing collar or surface and being adapted to provide an intimate seal with such surface. When a cap and the insert therefor are both provided with the circular or annular depressions or grooves referred to, it is preferable that such depressions coincide whereby the depression in the cap fits within the depression in the sealing collar.

As an alternative to the above, the metallic cap may, if desired, be provided with an oppositely disposed flat circular depression, that is one which opens toward the bottle, which depression may conveniently be stamped into the metallic cap during the stamping operation in which the cap is formed. When a cap of this formation is employed, the sealing disc preferably includes a packing or sealing collar including a portion adapted to lie in the said depression in the cap.

In the case of bottles which have a substantially smooth transition from the inner vertical wall of the mouth of the bottle to the horizontal mouth surface, rather than a sharp angle, it is an object of the invention to provide a cap having a central depression adapted to fit within the mouth of the bottle and including an upwardly extending annular rim portion adapted to correspond substantially to the shape of the said transition portion of the bottle mouth.

Further in accordance with the above object, the central depression in the cap may be drawn substantially deeper so that its depth corresponds at least to half the height of the metallic cap, wherein the vertical wall of the said depression is, by preference, conical, in order to obtain or provide a sealing surface on the inner wall of the mouth of the bottle in addition to the upper horizontal sealing surface normally provided.

Since, according to the present invention, sealing takes place only in a relatively limited area, it is only necessary that the sealing material in that limited area, that is in the region of the packing surface referred to hereinbefore, possess a required minimum thickness. In view of the nature of the seal effected, the material outside of the said limited region of sealing may be formed of relatively thin material, as thin as possible to suit the purpose, since the material in the areas of the sealing disc outside of the sealing collar merely have the task of preventing contact between the contents of the bottle and the metallic cap. This material of relatively thin section also serves the purposes of retaining the sealing disc in the cap and, if necessary, to prevent application of the metal cap inwardly toward the mouth or lip of the bottle. Since the sealing disc as thus formed is of relatively thin section throughout the majority of its area, it will be appreciated that sealing inserts made according to the present invention are formed in an extremely efficient, economical and practical manner.

From the foregoing, it will be appreciated that the sealing discs or inserts, as formed according to the present invention, will generally require no greater outer diameter than that of the sealing collar itself. Such design is preferred. This is particularly true if the sealing insert is itself formed or injected in the metallic cap. If, however, the sealing inserts or discs are manufactured separately from the metallic cap, it is preferable to provide a radially extending rim portion outside of the sealing collar, of less thickness than the collar, which rim is adapted to center and clamp the insert or sealing disc in the cap. The outer rim referred to may be dispensed with if the sealing discs are accurately centered in the cap and bonded thereto by gluing, sealing, or in other manners.

A further object of the present invention is the provision of a crown type closure including a metallic cap and a sealing material positioned within the cap, the material extending substantially to the rim of the cap, whereby upon securing the cap to the bottle, the metallic cap will not come into contact with the mouth of the bottle. Such structure would be preferable in providing an extremely sanitary seal. However, designs that would in any way impair the seal should be avoided.

A still further object of the present invention is to provide an improved bottle closure of the crown type comprising a metallic cap adapted to be secured to the bottle and having an aperture or cutouts in the central portion thereof, and an imperforate sealing disc inserted within the cap to close the aperture or cutouts in the cap. The cap as thus formed includes an imperforate annular rim portion, within which the sealing collar is adapted to be positioned and by means of which a seal is provided between the bottle and the cap. The central portion of the cap, however, may have a circular aperture therein, or the same may be cutout in various patterns as desired. The central portion of the sealing disc, which is preferably of relatively thin section, provides a seal between the bottle and the openings in the cap, which seal is adapted to be perforated in a very ready and convenient manner to provide a drinking aperture, or an aperture through which straws may be inserted into the bottle, whereby the contents of the bottle may be removed without any necessity for removing the bottle cap. This is of particular advantage since it eliminates the necessity for bottle openers, the sealing material being adapted to be perforated by any suitable instrument normally carried in a person's pockets, such as a key for example. The advantages of such structure, for capping beverages used at picnics, for example, will be obvious.

For such bottle closures, the seal may preferably consist of a plastic material which, for reasons of esthetic effect, may either be transparent or colored.

In connection with the above, it has proved advantageous to bevel or bead the inner edge of the metallic cap adjacent the aperture or openings therein, with the bead or beveled edge extending toward the mouth of the bottle.

If the bottles, as capped in accordance with the foregoing, are to be reused, as is the common practice, the bottles, together with the closures, are returned to the bottling company so that the bottling company is able to reclaim the sealing material and the metallic caps if desired. In addition, such structure provides substantial economies in the expenditure of sheet metal.

It is a further object of the present invention to provide an improved crown closure including a metallic cap having a stiffening rib or corrugations disposed adjacent the outer edge or rim thereof, so that the cap, when being applied to a bottle, will not be deformed nor drawn downwardly deeper beyond the lip or mouth of the bottle than is permissible in the manufacture of a good secure closure. This object of the invention also accommodates the manufacture of the metallic caps from metal of thinner section than is normally required, which provides additional economies in the manufacture of the cap.

As has been pointed out hereinbefore, a variety of materials may be employed according to the present invention in the formation of the sealing disc or seal of the invention. Such materials must meet the essential requirements of a certain minimum resiliency, and an inertness with respect to the taste of the beverage to be bottled. In individual cases, rubber, latex, caoutchouc hydrochloride or other materials may be employed, if the taste or quality of the contents of the bottle is in no way impaired by such materials. However, preference is given, according to the present invention, to synthetic substances, particularly polyethylene, polyvinylchloride and other plastic materials having properties similar to the two specific examples, provided of course, that such materials have no effect on the contents of the bottle.

The present invention has further for its object, the process of manufacturing the bottle closures according to the present invention, which, as is understood, may be of a variety of types.

For example, the seal as provided according to the present invention may be formed as a disc by injection molding, which disc may then be placed separately into a manufactured metallic cap, which cap preferably comprises a metallic stamping. This method has the particular merit that a large number of sealing discs can efficiently and economically be formed in a single operation by means of a multi-purpose machine. As thus formed, the separately manufactured sealing discs or inserts may then be placed individually into the finished caps. In certain cases, the sealing inserts may be secured in the caps by gluing, or by the application of pressure and/or heat, the latter preferably generated in a dielectric manner, which securement may be effected over the entire surface of the seal or only a portion thereof, such, for example, as at the center, or along a circular or annular area, for instance in the region of the sealing collar.

As to the separately manufactured sealing inserts, it is particularly convenient to provide the same as entirely symmetrical units, both with respect to the axis and the horizontal plane of the disc, so that the disc is readily and easily placed in position in the metallic cap. Since no irregular surfaces are presented, it will be immaterial how the discs are inserted in the cap.

According to the present invention, another mode of manufacture resides in the provision of a thermoplastic sealing material, in the form of discs of uniform thickness, adapted to be applied to the material from which the metallic caps are to be formed. As an alternative, such discs of thermoplastic sealing material may be inserted into the finished caps. In either case, the material after being placed in the caps is formed under application of heat and pressure. If necessary, modifications in the shaping of the caps may take place before, during, or after the operation in which the sealing material is formed to the desired configuration.

A further processing possibility resides in the formation of the metallic cap in immediately successive operations in one of which the sealing material is applied either to the sheet metal from which the caps are to be formed, or to the metal of the individual caps, and simultaneously or subsequently formed in a continuous operation.

According to another method of the present invention for the manufacture of the crown closures, a compound material is utilized comprising sheet metal coated with a suitable sealing material. Finally, in a modification according to the invention, the sealing material may be directly injection molded in each cap. In the event, in the latter method, that the sealing material should not adhere to the cap, it is possible to provide a metallic cap having cuts or the likes therein to insure a perfect anchoring of the sealing material in the caps. As an alternative, small pieces of sheet metal may be embedded in the injected material to insure anchoring.

Other objects and advantages of the present invention will become apparent in the following detailed description of preferred embodiments of the invention.

Now, in order to acquaint those skilled in the art with the manner of making and using the crown closure of the present invention, I shall describe, in connection with the accompanying drawings, preferred embodiments of my crown closure and preferred methods of making such closure.

In the drawings, wherein like reference numerals indicate like parts:

Figures 1 to 20, inclusive, are partial vertical sectional views of each of twenty different embodiments of the invention.

Referring now to the drawings, I have shown in Figure 1, a crown cap 1 formed according to the present invention and secured to the mouth 2 of a conventional glass bottle. The mouth 2 of the bottle is annular and the inner wall thereof defines the bottle openings. On its outer surface, the mouth of the bottle is provided with a radial recess presenting a downwardly facing shoulder against which the inwardly extending portions of the peripherally corrugated portion of the cap are adapted to engage to secure the cap to the bottle, as is conventional in the art. The cap 1, as shown in Figure 1, is substantially conventional in design and manufacture and it is principally the seal 3 positioned therein that incorporates the advantages of the present invention. As shown, the seal 3 is in the form of a disc manufactured of synthetic material and adapted to be inserted, positioned, or suitably secured within the cap 1. At the peripheral margin thereof, the sealing disc 3 includes an annular sealing collar 4 of increased thickness which is adapted to rest upon and seal against the upper rim 5 of the mouth 2 of the bottle. Radially inwardly of the sealing or packing collar 4, the sealing insert 3 includes a disc-like central portion 6 of very thin section. As will be appreciated, the portion 6 of the sealing insert need serve only to prevent contact between the metallic cap 1 and the contents of the bottle, and there is thus no necessity for formation of this portion of the disc of the same thickness as the collar 4. Accordingly, it will be appreciated that the sealing insert provided according to the present invention is highly economical.

As will be further noted from Figure 1, the sealing collar 4 of the sealing insert 3 is disposed with the inner edge thereof immediately adjacent the inner wall of the mouth 2 of the bottle, and the radial extent of the sealing collar 4 is approximately 75 percent of the thickness of the mouth 2. This is substantially different from conventional seals, wherein the annular sealing area is disposed on the curved portion of the mouth 2 of the bottle radially outwardly of the horizontal rim 5. As has been pointed out hereinbefore, the disposition of the seal in the manner shown that is as provided according to the present invention, leads to a construction which is adapted to maintain a tight seal despite gas pressures of one and one-half to two times as great as those capable of being contained by conventional crown closures.

Figure 2:
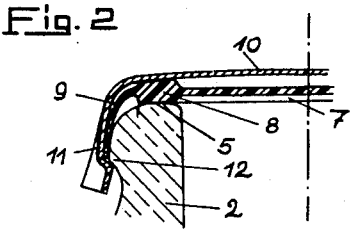

In Figure 2, I have shown a further embodiment of the present invention as comprising a sealing insert 7 formed entirely symmetrically, both with respect to the vertical axis and the horizontal plane thereof, and including, radially outwardly of the sealing elevation or packing collar 8, a thin rim 9. The rim 9 is adapted to position and retain the sealing insert or disc 7 within the metallic cap 10. When the cap is secured to the bottle, the thin rim 9 places itself between the rim 11 of the cap 10 and the sealing lip 12 of the mouth 2, so that the metallic cap does not engage the mouth of the bottle, whereby a highly sanitary condition is maintained.

Figure 3:
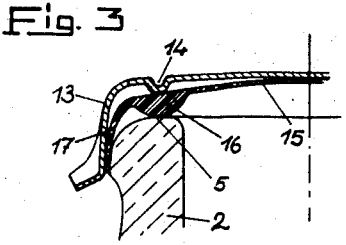

The bottle closure shown in Figure 3 comprises a metallic cap 13, which is circularly recessed, or includes an annular depression 14, and a sealing disc 15 provided with a sealing collar 16 the diameter of which corresponds to that of the recess or depression 14. When the cap 13 is secured to the bottle, the recessed or depressed portion of the cap 13 presses against the sealing collar 16 of the insert 15 so that the collar 16 is forced at an increased pressure onto the top rim 5 of the mouth 2 of the bottle. The sealing disc or insert 15 also includes an outer rim 17 similar to the rim 9 in the embodiment of the seal shown in Figure 2. As shown, the outer rim 17 serves the same purposes and is disposed in the same location as the rim 9 of the Figure 2 embodiment of the invention.

Figure 4:
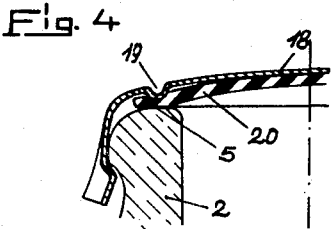

Referring now to Figure 4, I have shown a bottle closure comprising a metallic cap 18 having a circular recess or annular depression 19 therein, which depression is adapted to press against a sealing insert 20 to force the insert into sealing engagement with the rim 5 of the mouth 2 of the bottle. The insert 20, as shown, may suitably comprise a disc of uniform thickness throughout, the disc being forced, adjacent the peripheral margin thereof, against the top rim of the bottle under high pressure by the depression 19.

Figure 5:
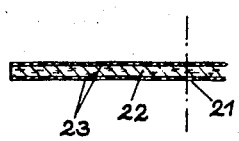

In Figure 5, a modified form of the sealing insert, similar to the insert 20 of the embodiment of the invention shown in Figure 4, is shown as comprising a disc 21 of uniform thickness formed of a compound material. Such compound material may suitably comprise a highly elastic but not completely tasteless material 22 having on both sides thereof thin overlays 23 of a polyethylene foil. The elastic material 22, such as cork rubber, or the like, enhances the sealing capabilities of the insert, and the layers 23 of polyethylene foil serve to prevent contact between the contents of the bottle and the material 22. By providing a foil 23 on each side of the material 22, it is immaterial which of the surfaces is turned toward the inside or outside of the bottle, whereby ready assembly of the insert in the metallic cap is facilitated.

Figure 6:
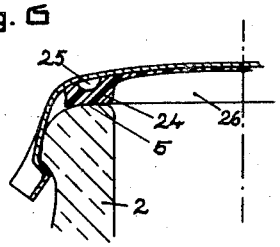

The bottle closure shown in Figure 6 is substantially identical to that shown in Figure 1 with the exception that the sealing collar 24 of the sealing disc or insert 26 is provided with a circular or annular groove or recess, as at 25, in the upper surface thereof. The material for the sealing disc 26 may suitably comprise a polyethylene so that the elasticity of the sealing collar 24 is appreciably increased by providing the groove 25. The sealing disc 26 is preferably bonded to the metallic cap by the application of pressure and heat, particularly in the central region of the cap.

Figure 7:
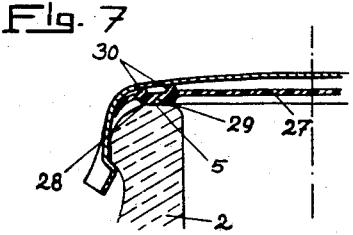

Figure 7 illustrates a further form of bottle closure according to the present invention. In this embodiment, a thin plastic disc 27 of a diameter somewhat greater than the outside diameter of the mouth 2 of the bottle includes, in the region of the sealing surface 28 thereof, a sealing collar 29 on the side thereof facing the bottle mouth, and an aligned collar on the opposite side thereof. The latter collar is provided with a central groove to comprise, in effect, two concentric circular ridges 30 on the side of the insert facing the metallic cap.

Figure 8:
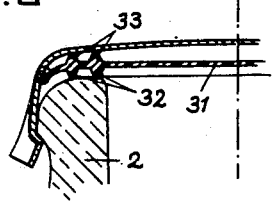

The closure shown in Figure 8 comprises a thin foil disc 31 having, in the region of the sealing surface 28 thereof, two sealing collars which are disposed in aligned relation to opposite sides of the central plane of the disc 31. Each of the collars is provided with a central groove so that each, in effect, presents two spaced concentric sealing ribs 32 and 33, respectively.

Figure 9:
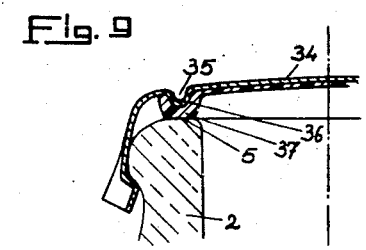

The bottle closure shown in Figure 9 is substantially identical to that shown in Figure 6, with the exception that the metallic cap 34 includes an annular depression or circular recess 35 which is adapted to project into the circular groove 36 provided in the sealing collar 37 of the sealing insert.

Figure 10:
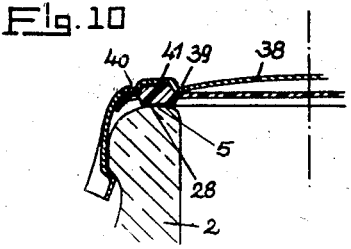

In Figure 10, I have shown a bottle closure including a metallic cap 38 provided with a pair of concentric circular recesses or indentations 39 and 40 which define therebetween a relatively flat depression opening in the direction of the bottle. Said depression is adapted for the reception of a sealing collar 41 provided on the sealing disc so that the sealing disc is accurately positioned in the cap and with respect to the sealing surface 28 whereby the disc cannot move or change position when the cap is being secured to the bottle.

Figure 11:
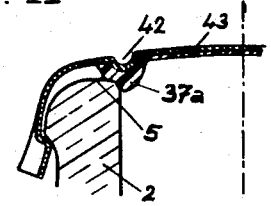

In the bottle closure shown in Figure 11, the diameter of the circular recess or annular depression 42 provided in the metallic cap 43 corresponds approximately to the inner diameter of the mouth 2 of the bottle. Otherwise, the structure corresponds very closely to that shown in Figure 9, with the exception that the sealing collar 37a of the sealing disc is located with the central portion thereof disposed immediately above the inner edge of the mouth 2 of the bottle, so that the seal is effected partially on the rim 5 of the mouth 2 of the bottle, and partially on the inner wall of the mouth.

Figure 12:
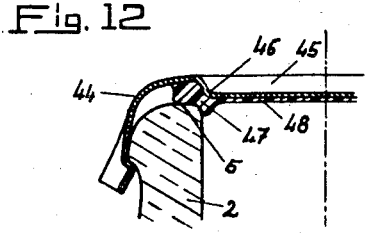

Substantially the same sealing relationship is provided in the embodiment of the invention shown in Figure 12, wherein the closure comprises a metallic cap 44 including a flat circular central depression 45. In the region of the edge 46 of the central depression 45, a sealing collar 47 of a sealing disc 48 is disposed on the inner side of the cap, the configuration of the sealing collar 47 being such as to conform substantially to the inner surface of the central portion 45, the edge 46, and the upstanding peripheral rim portion of the cap 44. Preferably, the central portion of the sealing disc 48 is of relatively thin section, in accordance with the objects of the invention set forth hereinbefore.

Figure 13:
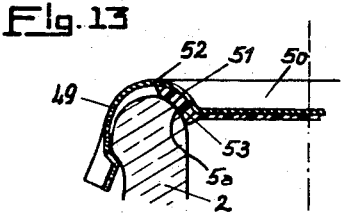

The bottle partially shown in Figure 13 is slightly different than the bottle as disclosed in the remainder of the figures and comprises a mouth portion 2a including a gentle transition portion 5a between the inner wall of the mouth 2a and the top edge of the mouth. In the case of such bottles, the closure preferably seals against the said transition portion of the bottle mouth and preferably comprises a metallic cap 49 having a central depression 50 of generally circular outline, which depression is bounded by a transition portion 51 extending upwardly from the depression 50 to define a generally upstanding peripheral rim portion 52 of the cap. As will be appreciated, the transition portion 51 and the rim 52 of the cap correspond substantially to the configuration of the lip of the bottle. In such construction, the sealing collar 53 preferably lies between the transition portions 5a and 51 of the bottle and cap, respectively. As shown, the sealing insert or disc may suitably comprise a central portion of relatively thin section including an angularly upwardly extending annular rim portion 53.

Figure 14:
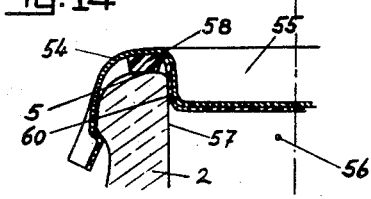

A somewhat similar bottle closure design, but adapted for conventional bottles, is shown in Figure 14 as comprising a metallic cap 54 having a cup-like central depression 55 projecting into the mouth 56 of the bottle, the bottle having a vertical mouth wall 57 which is generally conical. The sealing collar 58 of the sealing disc 59 is preferably so arranged that it rests on the top rim 5 of the mouth of the bottle and is disposed within the upstanding annular rim portion of the cap 54. The sealing disc 59 preferably comprises a central portion formed as a thin membrane integrally joined to the sealing collar 58, the said membrane being conformed to the depression 55 of the cap 54 so that when the cap 54 is secured to the bottle, a further seal is provided as at 60, between the inner wall 57 of the mouth of the bottle and the outer wall of the depression 55 of the cap. If desired, the sealing insert or disc 59 may be suitably formed by coating the cap 55, after formation thereof, with a suitable sealing material.

The bottle closures described with respect to Figures 1 to 14, inclusive, all preferably include a non-perforate metallic cap. However, as has been pointed out hereinbefore, the central portion of the cap may be cut out or apertured to provide a particularly advantageous closure. The embodiments of the invention shown in Figures 15 to 20, inclusive, are directed to the provision of closures of this type.

Figure 15:
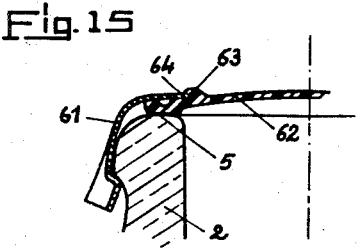

The closure shown in Figure 15 comprises a metallic ring 61 produced by cutting or stamping out the center of a conventional metallic cap. The sealing or closure disc or insert 62 for the cap 61 corresponds generally to that shown in Figure 6, with the exception that the same includes, on its upper surface, a circular ridge 63 including a radially projecting rim 64 to define a recess within which the inner marginal edge of the cap rim 61 may be positioned. As will be appreciated, the disc may readily be secured to the metallic ring 61 by pressing the portions 63 and 64 of the insert through the central aperture in the cap 61. Instead of a whole ring, it may be suitable in certain cases to provide only sectors of a complete ring. In securing the closure to a bottle, the seal between the bottle and the closure is effected in the same manner as described hereinbefore at the sealing collar. The aperture or opening in the cap 61 is sealingly closed by the central portion of the disc 62. The disc is adapted to withstand high internal gas pressures, and at the same time, is adapted to be pierced or punctured in a relatively easy manner by means of a somewhat pointed instrument, for example, a nail file, a key, or the like. Thus, the efficient seal described hereinbefore is effected, and the further advantage is provided that a drinking aperture may readily be formed in the cap without the necessity for a bottle opener.

Figure 16:
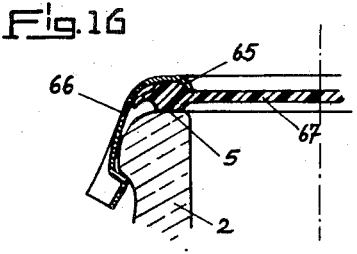

A modified form of the invention is shown in Figure 16, wherein the inner edge 65 of a metallic cap ring 66 is beveled inwardly toward the mouth of the bottle so as to insure firm engagement with and holding of the sealing insert 67. As shown, the sealing insert 67 is substantially identical to that shown in Figure 10, the disc being positively positioned within the cap 66 by engagement of the beveled edge 65 of the cap with that portion of the sealing collar of the disc disposed to the cap side thereof.

Figure 17:
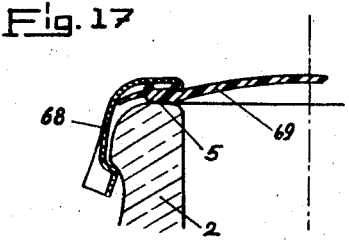

Figure 17 illustrates a similar closure of a somewhat modified construction, wherein the metallic ring 68 is substantially identical to the metallic ring 66 shown in Figure 16, and wherein the sealing insert 69 is substantially identical to the sealing insert 27 shown in Figure 7.

Figure 18:
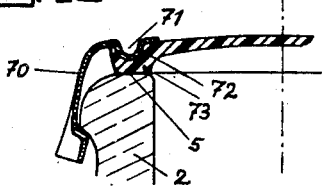

The bottle closure shown in Figure 18 comprises a parallel to the closure shown in Figure 9, wherein the metallic cap 70 comprises a ring, formed by providing a central aperture in the cap shown in Figure 9, the cap 70 being provided with an annular groove or depression 71 which is adapted to engage in the circular or annular groove 72 provided in the sealing collar 73 of the sealing disc.

Figure 19:
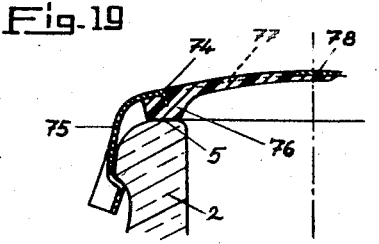

In Figure 19, I have shown a bottle closure comprising a cap having a cut out portion, rather than a center aperture, in the central portion thereof. As shown, the cap comprises a rim portion 75, a central portion 78, and a plurality of radial ribs 77 connecting the rim 75 and the central portion 78. Intermediate the ribs 77, the inner edge of the rim 75 is turned inwardly, as is indicated at 74, whereby the same is adapted to be imbedded in the material of the sealing collar 76 of the sealing disc. In such construction, it may be preferred to provide a specially molded or formed sealing disc having an upper surface complementary to the lower surface of the cap so that the cap and the closure disc are mated with one another when assembled. As an alternative, the sealing disc may be molded directly to or with the cap to provide the structure defined.

Figure 20:
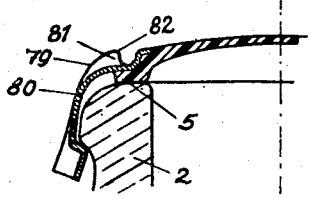

As is shown in Figure 20, a metallic cap 80 may be so formed as to provide an outer annular rim 79 within which radial grooves 81 are pressed, whereby a plurality of circumferentially spaced upstanding radial ribs 82 are provided. Such structure results in a corrugated rim 79 which is stiffened by the ribs 82 so as to prevent distortion of the cap 80 upon application of the same to the mouth 2 of the bottle. In other particulars, the embodiment of the invention shown in Figure 20 is quite similar to that shown in Figure 18. As will be appreciated, the corrugated rim of the embodiment of the invention shown in Figure 20 may be incorporated in any of the remainder of the closure structures disclosed in the present application.

All of the embodiments of the invention disclosed in Figures 15 to 20, inclusive, provide a cap having at least one opening in the central portion thereof, which opening is sealingly closed by the relatively thin central portion of the sealing disc or insert. This thin section of sealing material is adapted to be readily cut, punctured, or pierced to accommodate pouring of the contents from the bottle, the insertion of straws in the bottle, or the direct drinking of the contents of the bottle. Accordingly, such embodiments of the present invention dispense with the necessity for bottle openers. The advantages and convenience of such structure will be obvious. In addition, the plastic sealing insert may contain suitable advertising or instructions, and the same may be transparent or colored, to enhance the attraction of a consumer to the bottled goods.

In all embodiments of the invention, an improved seal is provided. Due to the location of the annular sealing area, the closures of the present invention are capable of withstanding particularly high gas pressures. They avoid or obviate all of the shortcomings of closures employed heretofore. The sealing material is inert with respect to the contents of the bottle and is incapable of contaminating the taste or quality of the contents of the bottle. The provision of annular ribs or recesses in the cap accommodates an effective strengthening of the cap and accommodates the employment of thinner section material than normally would be required. The same is true of the radially ribbed corrugation structure disclosed in Figure 20. Accordingly, it will be appreciated that the present invention provides substantial advantages over prior proposals for crown closures. Likewise, it will be appreciated from the foregoing that the present invention provides improved methods of manufacturing crown closures and the seals therefor.

While I have described and shown what I regard to be preferred embodiments of my invention, it will be appreciated that various changes, rearrangements and modifications may be made therein without departing from the scope of the invention, as defined by the appended claims.

I claim:

1. In the combination of a bottle and a crown closure, an improved closure and seal, said seal comprising an imperforate polyethylene disc, said disc being symmetrical in relation to both its median plane and its axis, said disc including a thin circular central portion, a thick annular sealing pad encircling said central portion and defining an annular sealing surface of small area on opposite sides of said disc engaging, respectively, with the mouth of the bottle and the inner surface of said closure, said central portion being of a diameter equal substantially to that of the opening in the bottle, the sealing surfaces on the opposite sides of said pad having an outer diameter no greater than approximately the diameter of the bottle opening plus twice 75% of the thickness of the wall of the bottle defining the opening, and a thin flexible continuous annular portion encircling said pad, said closure comprising a metal annulus having an inner diameter equal substantially to the outer diameter of said central portion of said seal and including a depending rim portion of a diameter equal at least to the outer diameter of the mouth of the bottle crimped to the bottle, the inner margin of said annulus being beveled downwardly toward said central portion of said seal and engaging the inner margin of said pad to one side of the median plane of said seal, the outer diameter of said seal being greater than the inner diameter of said rim portion of said closure and fitting frictionally therein at its peripheral edge, said thin flexible portion of said seal effecting a secure fit of said seal in said closure, said seal being insertable in said closure with either side thereof exposed, said sealing surfaces of said seal having high pressure sealing engagement per unit area with a limited area of the mouth of the bottle and said annulus respectively, said beveled inner margin of said annulus retaining said seal in position in said closure, said central portion of said seal closing the opening in the bottle and the central portion of said closure and being freely exposed to be punctured to accommodate emptying of the bottle without the necessity for removal of said closure.

2. In the combination of a bottle and a crown closure, an improved closure and seal, said seal comprising an imperforate plastic disc, said disc being symmetrical in relation to both its median plane nd its axis, said disc including a thin circular central portion, a thick annular sealing pad encircling said central portion and defining an annular sealing surface of small area on opposite sides of said disc engaging, respectively, with the mouth of the bottle and the inner surface of said closure, said central portion being of a diameter equal substantially to that of the opening in the bottle, the sealing surfaces on the opposite sides of said pad being of an outer diameter no greater than approximately 90% of the outer diameter of the mouth of the bottle, and a thin flexible continuous annular portion encircling said pad, said closure comprising a metal annulus having an inner diameter equal substantially to the outer diameter of said central portion of said seal and including a depending rim portion of a diameter equal at least to the outer diameter of the mouth of the bottle crimped to the bottle, the inner margin of said annulus being beveled downwardly toward said central portion of said seal and engaging the inner margin of said pad to one side of the median plane of said seal, the outer diameter of said seal being greater than the inner diameter of said rim portion of said closure and fitting frictionally therein at its peripheral edge, said thin flexible portion of said seal effecting a secure fit of said seal in said closure, said seal being insertable in said closure with either side thereof exposed, said sealing surfaces of said seal having high pressure sealing engagement per unit area with a limited area of the mouth of the bottle and said annulus respectively, said beveled inner margin of said annulus retaining said seal in position in said closure, said central portion of said seal closing the opening in the bottle and the central portion of said closure and being freely exposed to be punctured to accommodate emptying of the bottle without the necessity for removal of said closure.

3. In the combination of a bottle and a crown closure, an improved closure and seal, said seal comprising an imperforate plastic disc, said disc including a thin circular central portion, a thick annular sealing pad encircling said central portion extending to opposite sides of the plane of said central portion, said annular sealing pad defining an annular sealing surface of small area on opposite sides of said disc engaging respectively with the mouth of the bottle and the inner surface of said closure, said central portion being of a diameter equal substantially to that of the opening in the bottle, the sealing surfaces on the opposite sides of said pad being of an outer diameter no greater than approximately 90% of the outer diameter of the mouth of the bottle, and a thin flexible continuous annular portion encircling said pad, said closure comprising a metal annulus having an inner diameter equal substantially to the outer diameter of said central portion of said seal and including a depending rim portion of a diameter equal at least to the outer diameter of the mouth of the bottle crimped to the bottle, the inner margin of said annulus being beveled downwardly toward said central portion of said seal and engaging the inner margin of said pad to one side of the median plane of said seal, the outer diameter of said seal being greater than the inner diameter of said rim portion of said closure and fitting frictionally therein at its peripheral edge, said thin flexible portion of said seal effecting a secure fit of said seal in said closure, said sealing surfaces of said seal having high pressure sealing engagement per unit area with a limited area of the mouth of the bottle and said annulus respectively, said beveled inner margin of said annulus retaining said seal in position in said closure, said central portion of said seal closing the opening in the bottle and the central portion of said closure and being freely exposed to be punctured to accommodate emptying of the bottle without the necessity for removal of said closure.

4. In the combination of a bottle and a crown closure, an improved closure and seal, said seal comprising an imperforate plastic disc, said disc including a thin circular central portion, a thick annular sealing pad encircling said central portion and extending to opposite sides of the plane of said central portion, said annular sealing pad defining an annular sealing surface of small area on opposite sides of said disc engaging respectively with the mouth of the bottle and the inner surface of said closure, said central portion being of a diameter equal substantially to that of the opening in the bottle, the sealing surfaces on the opposite sides of said pad being of an outer diameter no greater than approximately 90% of the outer diameter of the mouth of the bottle, said closure being apertured in its central portion and including an annular portion having an inner diameter equal substantially to the outer diameter of said central portion of said seal and including a depending rim portion of a diameter equal at least to the outer diameter of the mouth of the bottle crimped to the bottle, the inner margin of said annular portion being beveled downwardly toward said central portion of said seal and engaging the inner margin of said pad to one side of the median plane of said seal, said sealing surfaces of said seal having high pressure sealing engagement per unit area with a limited area of the mouth of the bottle and said annular portion respectively, said beveled inner margin of said annular portion retaining said seal in position in said closure, said central portion of said seal closing the opening in the bottle and the apertured portion of said closure and being freely exposed to be punctured to accommodate emptying of the bottle without the necessity for removal of said closure.

References Cited in the file of this patent

UNITED STATES PATENTS

| | | |
|---|---|---|
| 785,116 | Perry | Mar. 21, 1905 |
| 1,170,160 | Ingram et al. | Feb. 1, 1916 |
| 2,200,600 | Grapp | May 14, 1940 |
| 2,543,774 | Gora | Mar. 6, 1951 |
| 2,543,775 | Gora | Mar. 6, 1951 |
| 2,581,647 | Genovese | Jan. 8, 1952 |
| 2,681,742 | Miller | June 22, 1954 |
| 2,684,774 | Aichele | July 27, 1954 |
| 2,696,318 | Kihm | Dec. 7, 1954 |
| 2,751,101 | Leclerc | June 19, 1956 |

FOREIGN PATENTS

| | | |
|---|---|---|
| 13,232 | Great Britain | of 1905 |
| 837,966 | Germany | May 5, 1952 |